3,188,359
NON-CATALYTIC DEALKYLATION OF ALKYL SUBSTITUTED BENZENE-RING COMPOUNDS
Frank L. Lempert, Rutherford, N.J., and Robert J. Reid, Hastings on Hudson, N.Y., assignors to Pullman Incorporated, a corporation of Delaware
Filed Mar. 1, 1962, Ser. No. 176,713
12 Claims. (Cl. 260—672)

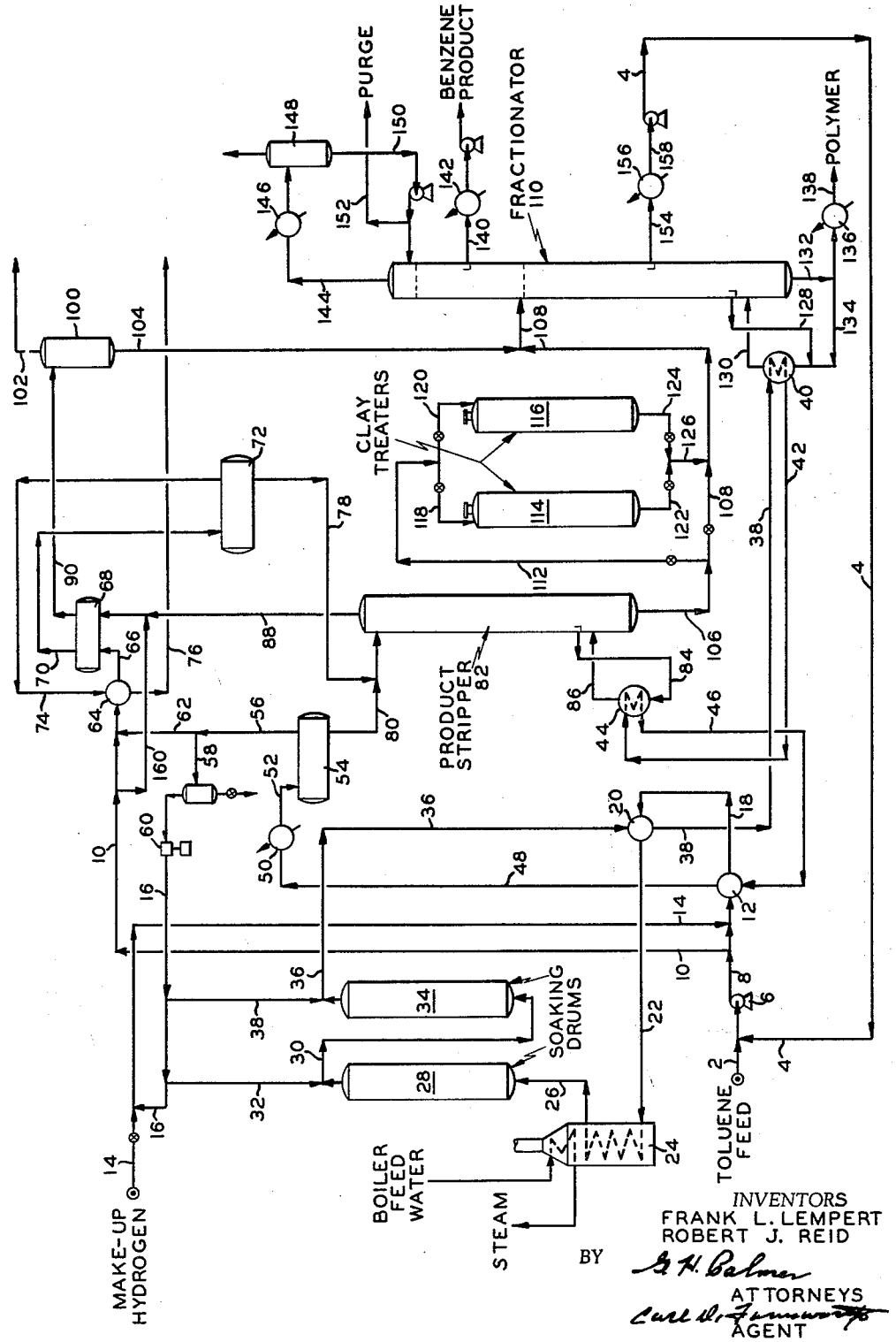

This invention relates to the demethylation of alkyl substituted aromatic hydrocarbons and is directed in one aspect to the method of demethylating toluene and the process steps for recovering an aromatic product thereof.

The dealkylation of ring compounds has been described in the literature and has been particularly directed to partial or complete demethylation of simple and complex ring compounds in the presence of a catalyst to accomplish the desired result. In such processes, however, substantial quantities of gas and coke are formed, the conversion to desired products has, therefore, been less than desired and the catalyst used therein is relatively rapidly deactivated.

An object of this invention is to obtain high yields of demethylated benzene compounds.

Another object of this invention is to provide a process of high thermal efficiency for thermally demethylated alkyl substituted benzene ring compounds and recovery of the product thereof.

A further object is directed to the novel method and sequence of process steps for obtaining high yields of benzene from thermally dealkylated toluene.

Other objects and advantages of this invention will become more apparent from the following description.

In accordance with this invention an improved process of high thermal efficiency is provided for the non-catalytic conversion of at least about 90 percent of a toluene feed stream to benzene and the recovery of the benzene product thereof. More specifically, the present invention is directed to thermally demethylating toluene in the presence of hydrogen in a plurality of sequentially connected demethylating reactor zones sized to limit the residence time of the reactants in each zone and permit controlling the exothermic demethylating reaction temperature in each zone from exceeding a temperature above about 1500° F., and preferably not substantially above about 1350° F. Accordingly, the reactant residence time in each zone is controlled so that an effluent withdrawn therefrom will be at a temperature below that promoting cracking of benzene produced therein. The effluent recovered from each demethylating reactor zone is quenched to a lower temperature with a cool recycle product stream of the process so that the quenched effluent passed from the first reactor zone to the second reactor zone is above the threshold temperature, that is, the temperature at which the demethylating exothermic reaction is initiated and the effluent recovered from the last reaction zone of the series is quenched to a lower temperature below threshold temperature, but not substantially therebelow, in order to use the hot effluent as hereinafter described. Accordingly, cooling of the effluent recovered from the last reaction zone is held to a minimum below reaction temperature and controlled to permit efficient and economical utilization of the quench material obtained from and used in the process in addition to the available heat energy of the effluent in the recovery steps of the process. Accordingly, the effluent is recovered from the final reaction zone at a maximum elevated temperature consistent with obtaining at least about 90 percent conversion of toluene to benzene and the thus recovered hot effluent is thereafter employed in an arrangement of process steps to preheat the feed introduced to the process, provide the reboiler heat duty of a product stripper and frractionator employed in the process. Having thus recovered and utilized the available heat energy of the effluent, the effluent is further cooled to a temperature sufficient for introduction into a high pressure flash drum to separate a cool relatively high pressure vaporous stream from a liquid product stream comprising benzene. The liquid product stream recovered from the high pressure flash drum is passed to a stripping zone maintained under higher temperature conditions than the flash zone wherein the liquid product stream is thermally stripped to remove low-boiling hydrocarbons entrained therein as a vaporous stream from the upper portion of the stripping zone and the thus stripped liquid product stream is removed from the bottom of the stripper zone at an elevated temperature for separation into desired products. The liquid product removed from the bottom of the stripper may be treated to polymerize any unsaturated materials existing therein in suitable clay treaters or, it may be passed directly to a product fractionator as desired. The product fractionator is maintained under temperature and pressure conditions suitable to separate a benzene product of high purity from unreacted toluene feed and any polymer materials existing therein.

In the process of this invention, the major portion of the cool high pressure vaporous stream recovered from the high pressure flash zone is recycled after compressing to reaction pressure for use as quench fluid, in addition to recycling unconsumed hydrogen to the reaction zones of the process. By recovering a high pressure vaporous stream from the flash zone, the incremental compression requirements for compressing this stream to a pressure suitable for recycle to the reaction zones are maintained at a desirably low value, thereby enhancing the economics of the process. The remaining portion of the high pressure vaporous stream separated from the flash zone is passed to a refrigeration section of the process for recovery of benzene product material as described herein.

The recovery of benzene product material is maximized in the process of this invention by use of a novel refrigeration flash system on the vaporous streams recovered from the stripping zone and from the high pressure flash drum. This refrigeration system provides, among other things, a toluene wash as a safeguard against freezing of any benzene entrained in the vaporous stream and separated in the refrigeration system, as well as a substantial reduction in refrigeration requirements by precooling high pressure flash vapors with refrigeration flash vapors as more fully described hereinafter. The liquid product recovered from the refrigeration section is thereafter recovered with the benzene product stream separated in and recovered from the fractionator.

In the reaction involving the thermal demethylation of toluene to benzene it has been found that the hydrogen to hydrocarbon feed ratio introduced to the reactors and the product stream obtained from the reactors or soakers is of prime importance to its successful operation. That is, the selectivity of converted toluene to benzene is maximized with relatively high ratios of hydrogen to hydrocarbon feed and coke formation is minimized under these conditions. However, the use of relatively high hydrogen to hydrocarbon feed ratios greater than about 5 to 1 and as high as 10 to 1 unavoidably increases the cost of the process to a point where the process is economically unattractive. Furthermore, high pressure processes of the order of about 1000 p.s.i.g. and higher, at relatively high thermal demethylating temperatures, greatly detract from an economical process because of the horsepower requirements and utility cost to operate such a high pressure system, the need for using expensive alloys in the apparatus of the process and the cost of fabricating and maintaining such a high pressure process. In view of these adverse economic features, the improved process of the present invention is maintained and operated under conditions which substantially minimize these adverse effects by employing pressures less than about 600 p.s.i.g. and hydrogen to hydrocarbon feed ratios less than about 6 to 1 and preferably about 4 to 1 in the reactor feed stream.

The hydrocarbon feed which may be processed in accordance with this invention includes alkyl substituted benzene ring compounds comprising toluene, xylenes and ethyl benzene, either as a relatively pure hydrocarbon feed or a mixture of two or more of these materials may be used as the feed.

Having thus generally described the improved method and process of this invention, reference is now had to the drawing by way of example for a better understanding of a preferred embodiment thereof.

Referring now to the drawing, a toluene feed stream is introduced to the process by conduit 2, provided with pump 6, for compressing the fed to an elevated pressure. The compressed feed is then passed by conduit 8 to heat exchanger 12 wherein it is indirectly heated with hot product effluent obtained as hereinafter described. Make-up hydrogen-rich gas at an elevated pressure is introduced to the process by conduit 14 communicating with conduit 8 to which hydrogen containing recycle gas has been introduced by conduit 16. The reactant feed stream comprising toluene and hydrogen is heated in exchanger 12 to a temperature of about 340° F., and thereafter the reactant stream is passed by conduit 18 to a second indirect heat exchanger 20 wherein the reactant stream is further indirectly heated with reaction effluent to a temperature of about 940° F. The preheated reactant stream is passed from exchanger 20 by conduit 22 to a furnace 24 wherein final heating of the reactant feed stream up to about 1250° F. and above the reaction threshold temperature is accomplished. The efficiency of furnace 24 is enhanced by placing a steam generating section in the furnace after the feed heating section. The reactor feed stream heated to reaction threshold temperature in furnace 24 is then passed by conduit 26 to the first reactor or soaking drum 28. As indicated herein, soaking drum 28 is sized to provide a reactant holding time sufficient to obtain a maximum exothermic reaction temperature, not substantially above about 1350° F. when maintaining a reactor pressure of below about 600 p.s.i.g., preferably about 460 p.s.i.g. An effluent is recovered from reactor 28 by conduit 30 at a temperature not substantially above about 1350° F., which is immediately quenched to a temperature of about 1273° F. by direct mixing with a cool hydrogen-containing recycle stream obtained from a high pressure flash drum more fully described hereinafter and introduced by conduit 32. The effluent quenched in conduit 30 to a temperature above threshold temperature is thereafter introduced into a second reactor or soaking drum 34. The size of soaking drum 34 is sufficient to permit the exothermic reaction to continue such that an effluent withdrawn therefrom by conduit 36 is not substantially above about 1350° F. The effluent in conduit 36 is then quenched to a temperature below threshold temperature and about 1100° F. by direct mixing with a portion of the cool recycle stream obtained from the high pressure flash drum hereinbefore mentioned and introduced by conduit 38.

In the method of this invention, elongated substantially vertical reactor or soaking drums are provided and arranged for upflow of the reactant feed stream through each of the sequentially connected soaking drums. Although the soaking drums 28 and 34 are shown side by side, they may be positioned in vertical alignment for upflow of the reactant material therethrough. It is important in the method of this invention that upflow of the reactant feed stream through the soaking drums be employed in order that back-mixing of introduced reactants is substantially avoided, thereby permitting better temperature control of the exothermic reaction taking place therein. Although the soaking drums may be the same size or of a different size than one another to provide the same or a different reactant holding time in the respective zone, and more than two soaking zones may be employed, it is important that the reaction zones be sized to permit controlling the exothermic reaction taking place therein so that the reaction effluent withdrawn from each zone is at a temperature below that tending to promote cracking and undesired polymerization of the reactant-product material.

The effluent in conduit 36 is quenched to a temperature of about 1100° F. and then passed to indirect heat exchanger 20, wherein the effluent gives up a portion of its heat to preheat the feed in conduit 18, thereby cooling the effluent to a temperature of about 700° F. The partially cooled effluent is then passed by conduit 38 to reboiler 40 associated with the bottom of a fractionator, more fully discussed hereinafter, to provide the heat duty of the fractionator. That is, in reboiler 40 the effluent gives up a portion of its heat and is cooled to a temperature of about 580° F. by indirect heat exchange with a liquid stream withdrawn from the lower portion of the fractionator. The thus cooled effluent is passed from reboiler 40 by conduit 42 to reboiler 44 associated with the bottom of a product stripper tower more fully discussed hereinafter. In reboiler 44 the effluent is further cooled to a temperature of about 495° F. from which it is withdrawn and passed by conduit 46 to heat exchanger 12 wherein the effluent gives up additional heat to the reactant feed stream in conduit 8, thereby being cooled to a temperature of about 345° F. Accordingly, the hot effluent recovered from reactor 34 supplies the heat duty of the fractionator and product stripper in addition to supplying the major portion of the heat to bring the reactant feed stream up to threshold temperature. Threshold temperature is intended to refer to that temperature at which the demethylating exothermic reaction is initiated. The hot effluent having thus supplied in a thermally efficient manner the major portion of the heat duty of the process is then passed from exchanger 12 by conduit 48 to a suitable cooler 50. Cooler 50 may be any suitable arrangement of coolers comprising a water cooler, air cooler, or a combination thereof which will sufficiently cool the effluent in conduit 48 for passage by conduit 52 to high pressure flash drum 54 maintained at a pressure of about 400 p.s.i.g. and a temperature of about 100° F. In high pressure flash drum 54 a vaporous stream comprising about 51 mol percent hydrogen, methane and a small amount of entrained benzene product is separated from a major benzene liquid product stream. The vaporous stream is removed from drum 54 by conduit 56 and separated into two streams with the major portion thereof being passed by conduit 58 to recycle compressor 60 and the minor portion of the stream being passed for further treatment by conduit 62 as discussed hereinafter. The recycle gas stream is compressed in compressor 60 to an elevated pressure of about 525 p.s.i.g. and suitable for recycle to the reactors, thereby raising the temperature of this stream to about 130° F. The thus compressed recycle stream is passed by conduit 16 to branched conduits 38 and 32 for use as quench material in the reactor effluent streams as discussed above. A third portion of this recycle stream is combined with hydrogen-rich make-up gas introduced to the process by conduit 14 and thereafter combined with the hydrocarbon feed to be demethylated and prior to the heat exchange steps hereinbefore discussed.

The vaporous stream of minor portion in conduit 62 which was recovered from the high pressure flash drum is further treated to obtain maximum recovery of entrained benzene product material. To accomplish this end the vaporous stream in conduit 62 is passed to indirect heat exchanger 64 wherein it is cooled to a temperature of about 65° F. by indirect heat exchange with refrigeration flash vapors obtained as hereinafter described. The vaporous stream cooled in indirect heat exchanger 64 is then passed by conduit 66 through a refrigeration cooler 68 to further cool the vaporous stream to a temperature of about 40° F. The thus cooled vaporous stream is then passed by conduit 70 to separator drum 72 maintained at a temperature of about 40° F. and a pressure of about 380 p.s.i.g. In separator 72 a vapor stream, referred to herein as refrigeration flash vapors, are separated and recovered from a liquid benzene stream. The refrigeration flash vapors of reduced temperature are passed by conduit 78 to heat exchanger 64 to precool the vaporous stream in conduit 62 as described above. The refrigeration flash vapors are recovered from exchanger 64 by conduit 76 and passed to the hydrogen plant.

The liquid benzene stream separated in drum 72 is withdrawn and passed by conduit 78 to conduit 80 wherein it is combined with the liquid stream recovered from high pressure separator drum 54. The thus combined stream is then passed to the upper portion of a product stripper tower 82.

Stripper tower 82 is maintained at a temperature in the range of from about 110° F. to about 450° F. and a pressure in the range of from about 305 p.s.i.g. to about 310 p.s.i.g., with heat being supplied to the lower portion of the stripper tower by passing a liquid stream withdrawn from the lower portion thereof by conduit 84 to heat exchanger 44 and thereafter returning the heated withdrawn stream to the tower by conduit 86 to supply the heat duty of the stripper tower. In stripper tower 82 a vaporous stream comprising about 2 mol percent benzene is recovered from the liquid product introduced thereto by conduit 80 and removed from the upper portion of the tower by conduit 88. The vaporous stream in conduit 88 is also passed through refrigeration drum 68 to cool this stream to about 40° F. from whence it is withdrawn and passed by conduit 90 to a separator drum 100 maintained at a temperature of about 40° F. and a pressure of about 290 p.s.i.g. In separator 100 a vapor stream is separated from a liquid stream comprising benzene, the vaporous stream is removed therefrom by conduit 102 and the liquid stream is removed therefrom by conduit 104.

A stripped liquid product stream comprising benzene is recovered from the bottom of stripper tower 82 by conduit 106. The liquid stream in conduit 106 may be passed directly to fractionator 110 by interconnecting conduit 108 or this liquid product stream may be first passed by conduits 106 and conduit 112 to a plurality of clay treaters 114 and 116 through branch conduits 118 and 120 to polymerize any unsaturated material in the liquid product stream, if desired. The thus treated liquid product stream is then passed by either conduits 122 or 124 to conduit 126 connected with conduit 108 leading to the fractionator. The liquid stream in conduit 104, recovered from separator 100, is also connected to conduit 108 in order that this recovered liquid material may be passed to fractionator 110.

Fractionator 110 is maintained at a temperature in the range of from about 210° F. to about 422° F. The heat duty of fractionator 110 is supplied by withdrawing a liquid stream from the lower portion of the tower by conduit 128, passing the thus withdrawn material through reboiler 40 and returning the heated liquid stream to the tower by conducit 130. Provision is also made for recycling a portion of the liquid polymer stream withdrawn from the bottom of the fractionator by conduit 132 by way of conduit 134 connected to reboiler 40 wherein the polymer stream is heated and thereafter returned to the tower by conduit 130. The remaining portion of the withdrawn polymer stream is passed to cooler 136 and then withdrawn from the process by conduit 138 for further use or treatment as desired. Fractionator tower 110 is designed to withdraw a benzene product stream from the upper portion thereof by conduit 140 provided with cooler 142 for cooling the benzene product stream to a temperature of about 100° F. To assure recovery of a high purity benzene product stream from the fractionator, the benzene stream is withdrawn from the fractionator at about the fifth tray and any lower boiling materials are withdrawn from the top of the tower by conduit 144, cooled in cooler 146 to a temperature of about 180° F. and then passed to separator drum 148. A portion of this material is employed as a cool reflux stream and is withdrawn from separator 148 and returned to the top portion of the fractionator above the point of withdrawal of benzene product material by conduit 150. Conduit 152 connected to conduit 150 is provided for withdrawing any excess reflux material from the system. Unconverted toluene is removed from a lower portion of the fractionator by conduit 154 provided with cooler 156 for reducing the temperature of the toluene stream to about 100° F. The cooled toluene stream in conduit 158 may be recycled to the toluene feed in conduit 2 and introduced thereto by conduit 4.

As a safety factor in the refrigeration section of the process herein described, provision is made for introducing toluene feed when necessary to the vaporous streams in conduits 62 and 88 by way of conduits 10 and 160 to avoid freezing of any benzene material, cooled in the refrigeration exchanger 68 and separated therefrom.

In the interest of simplifying the drawing presented herewith numerous valves, pumps and other related process equipment have not been included in the drawing, however, it is to be understood that these omitted items may be added to the drawing without departing from the scope of this invention. Having thus generally described the improved method and arrangement of process steps of this invention and set forth a specific embodiment thereof by way of example, it is to be understood that no undue restrictions are to be imposed by reason thereof.

We claim:

1. A process for the demethylation of toluene which comprises passing a preheated feed mixture containing hydrogen and toluene upwardly through a first reaction zone maintained under thermal demethylation conditions including an elevated pressure and a thermal demethylation temperature below about 1500 F. in the absence of a catalyst to obtain an effluent containing benzene and toluene at such elevated temperature and pressure, introducing a cooled high-pressure vaporous fraction obtained from a later portion of the process as hereinafter defined to quench-cool said effluent to a lower thermal demethylation temperature, passing such effluent at such lower temperature upwardly through a second reaction zone maintained under demethylation conditions including an elevated temperature and pressure in the absence of a catalyst to obtain a second effluent containing more benzene and less toluene than said first effluent at an elevated pressure and thermal demethylation temperature, introducing a cooled high-pressure vaporous fraction obtained from a later portion of the process as hereinafter defined to quench-cool such second effluent to a temperature at least slightly but not substantially below 1100° F., further cooling said second effluent by indirect heat exchange against suitable process streams thereby providing a substantial portion of the process heat requirements, and then flashing said cooled effluent at an elevated pressure to separate therefrom said cooled high-pressure vaporous fraction employed as a quench-cooling medium as hereinbefore defined and a first liquid stream, separating the first liquid stream to obtain a benzene product stream from unconverted toluene and recycling unconverted toluene to said first reaction zone.

2. A process for dealkylation of an alkyl substituted benzene-ring compound which comprises heating a hydrocarbon feed comprising an alkyl substituted benzene-ring compound with hydrogen to a thermal non-catalytic dealkylation temperature above about 1100° F., passing the thus heated feed upwardly through a first reaction zone maintained under dealkylation conditions to obtain a first effluent containing dealkylated compounds therefrom having a temperature not substantially above about 1350° F., withdrawing and quenching said first effluent to a temperature above 1100° F. with a cool high pressure vaporous fraction obtained as hereinafter described, passing the quenched first effluent upwardly through a second reaction zone maintained under dealkylation reaction conditions to obtain a second effluent contaiing dealkylated compounds, withdrawing and partially cooling said second effluent by quenching with a portion of said cool high-pressure vaporous fraction to a lower temperature than said dealkylation temperature, employing the partially cooled second effluent to preheat the feed passed to said first reaction zone in a heat exchange zone, further cooling said second effluent by giving up heat to a stripping zone and a fractionation zone hereinafter described, finally cooling the second effluent to a temperature sufficient to maintain a high-pressure flash zone at a temperature of about 1100° F., separating the finally cooled second effluent in said flash zone under conditions to recover therefrom said high-pressure vaporous fraction from a first liquid fraction, thermally stripping said first liquid fraction in said stripping zone, recovering a second liquid fraction from said stripping zone, separating said second liquid fraction in said fractionation zone under conditions to obtain an aromatic product stream from an unreacted hydrocarbon feed and recycling unreacted hydrocarbon feed to said first reaction zone.

3. A process for the dealkylation of alkyl substituted benzene-ring compounds which comprises passing a preheated feed mixture containing hydrogen and a compound selected from the group consisting of toluene, xylenes, and ethyl benzene upwardly through a first reaction zone maintained under thermal dealkylation conditions including an elevated temperature and pressure in the absence of a catalyst to obtain an effluent containing dealkylated compounds at an elevated pressure and thermal dealkylation temperature, introducing a cooled high-pressure vaporous fraction obtained from a later portion of the process as hereinafter defined to quench-cool said effluent to a lower thermal dealkylation temperature, passing such effluent at such lower temperature upwardly through a second reaction zone maintained under dealkylation conditions including an elevated temperature and pressure in the absence of a catalyst to obtain a second effluent containing more dealkylated compounds and less alkylated feed material than said first effluent at an elevated pressure and dealkylation temperature, introducing a cooled high-pressure vaporous fraction obtained from a later portion of the process as hereinafter defined to quench-cool such second effluent to a temperature at least slightly but not substantially below thermal dealkylation temperature, further cooling the effluent withdrawn from the last reaction zone by the combination of steps of giving up heat to a liquid fraction withdrawn from the lower portion of a fractionation zone, a liquid fraction withdrawn from the lower portion of a stripper zone and indirectly heating the feed passed to the first reaction zone, further cooling the effluent cooled in the above combination of steps and thereafter passing the cooled effluent to a high-pressure flash zone, in said flash zone separating and recovering therefrom said cooled vaporous stream from a first liquid stream, passing said first liquid stream to the upper portion of said stripper zone, recovering a second liquid stream from the bottom of said stripper zone, passing liquid recovered from the bottom of said stripper zone to said fractionator zone, in said fractionator zone separating and recovering therefrom a benzene-rich stream from an unreacted feed stream, and recycling separated unreacted feed to the first of said reaction zones.

4. The method of claim 3 wherein a portion of said cool vaporous stream is further cooled and separated to obtain a cool gas stream from a third liquid stream, combining said third liquid stream with said first liquid stream passed to said stripper zone and employing said cooled gas stream to effect cooling of said vaporous stream separated from said flash zone.

5. The method of claim 3 wherein stripped vaporous material is recovered from the upper portion of said stripper zone as a second vaporous stream, said second vaporous stream is cooled to separate a fourth liquid stream from a gaseous stream and said fourth liquid stream is combined with the liquid passed to said fractionator zone.

6. The method of claim 3 wherein the liquid stream withdrawn from the stripper zone is treated to polymerize unsaturates therein prior to passage to said fractionator zone.

7. The method of claim 3 wherein the liquid stream withdrawn from the stripper zone is passed directly to said fractionator zone.

8. The method of claim 3 wherein the quenched effluent obtained from the last reaction zone is at an elevated temperature sufficient to supply the heat duty of said fractionator zone and said stripper zone in addition to providing the major portion of the heat required to bring the reactant feed up to non-catalytic demethylating temperatures.

9. The method of claim 3 wherein the exothermic demethylating temperature gradient of each reaction zone is controlled by minimizing backmixing of reactants therein and maintaining upflow of reactants in said exothermic reaction zones.

10. A process for dealkylation of alkyl substituted benzene-ring compounds which comprises passing a preheated feed mixture containing hydrogen and an alkyl substituted benzene ring compound upwardly through the first of a plurality of sequentially connected reaction zones maintained under dealkylation conditions including an elevated temperature and pressure in the absence of a catalyst to obtain an effluent containing dealkylated compounds under an elevated pressure and thermal dealkylation temperature, introducing a cooled high-pressure vaporous fraction obtained from a later portion of the process as hereinafter defined to quench-cool such effluent to a lower dealkylation temperature, passing such effluent upwardly through the terminal reaction zone of said sequentially connected reaction zones to obtain an effluent containing dealkylated compounds at an elevated temperature and pressure, introducing a cooled high-pressure vaporous fraction obtained from a later portion of the process as hereinafter defined to quench-cool such effluent to a temperature at least slightly but not substantially below the thermal dealkylation temperature, further cooling said effluent by indirect heat exchange against suitable process streams and then flashing said effluent at an elevated pressure to separate therefrom said cooled high-pressure vaporous fraction employed as hereinbefore defined.

11. A process for the demethylation of toluene which comprises passing a preheated feed mixture containing hydrogen and toluene upwardly through a first reaction zone maintained under thermal demethylation conditions including an elevated temperature and pressure in the absence of a catalyst to obtain an effluent containing benzene and toluene at an elevated pressure and thermal demethylation temperature, introducing a cooled high-pressure vaporous fraction obtained from a later portion of the process as hereinafter defined to quench-cool said effluent to a lower thermal demethylation temperature, passing such effluent at such lower temperature upwardly through a second reaction zone maintained under demethylation conditions including an elevated temperature and pressure in the absence of a catalyst to obtain a second effluent containing more benzene and less toluene than said first effluent at an elevated pressure and thermal demethylation temperature, introducing a cooled high-pressure vaporous fraction obtained from a later portion of the process as hereinafter defined to quench-cool such second effluent to a temperature at least slightly but not substantially below thermal demethylation temperature, further cooling said second effluent by indirect heat exchange against suitable process streams thereby providing a substantial portion of the process heat requirements, and then flashing said cooled effluent at an elevated pressure to separate therefrom said cooled high-pressure vaporous fraction employed as a quench-cooling medium as hereinbefore defined.

12. A process for the demethylation of toluene which comprises passing a preheated feed mixture containing hydrogen and toluene upwardly through a first reaction zone maintained under thermal demethylation conditions including an elevated pressure and a thermal demethylation temperature below about 1500° F. in the absence of a catalyst to obtain an effluent containing benzene and toluene at such elevated temperature and pressure, introducing a cooled high-pressure vaporous fraction obtained from a later portion of the process as hereinafter defined to quench-cool said effluent to a lower thermal demethylation temperature, passing such effluent at such lower temperature upwardly through a second reaction zone maintained under demethylation conditions including an elevated temperature and pressure in the absence of a catalyst to obtain a second effluent containing more benzene and less toluene than said first effluent at an elevated pressure and thermal demethylation temperature, introducing a cooled high-pressure vaporous fraction obtained from a later portion of the process as hereinafter defined to quench-cool such second effluent to a temperature at least slightly but not substantially below 1100° F., further cooling said second effluent by indirect heat exchange against suitable process streams thereby providing a substantial portion of the process heat requirements, and then flashing said cooled effluent at an elevated pressure to separate therefrom said cooled high-pressure vaporous fraction employed as a quench-cooling medium as hereinbefore defined.

References Cited by the Examiner
UNITED STATES PATENTS

| | | | |
|---|---|---|---|
| 1,934,054 | 11/33 | Gohr | 208—107 |
| 1,972,948 | 9/34 | Payne | 207—107 |
| 2,381,522 | 8/45 | Stewart | 260—672 |
| 2,580,651 | 1/52 | Boyd | 202—72 |

ALPHONSO D. SULLIVAN, *Primary Examiner.*